Aug. 27, 1935.     J. G. CLEMENS     2,012,598
CLEAR VISION DEVICE
Filed Nov. 27, 1934
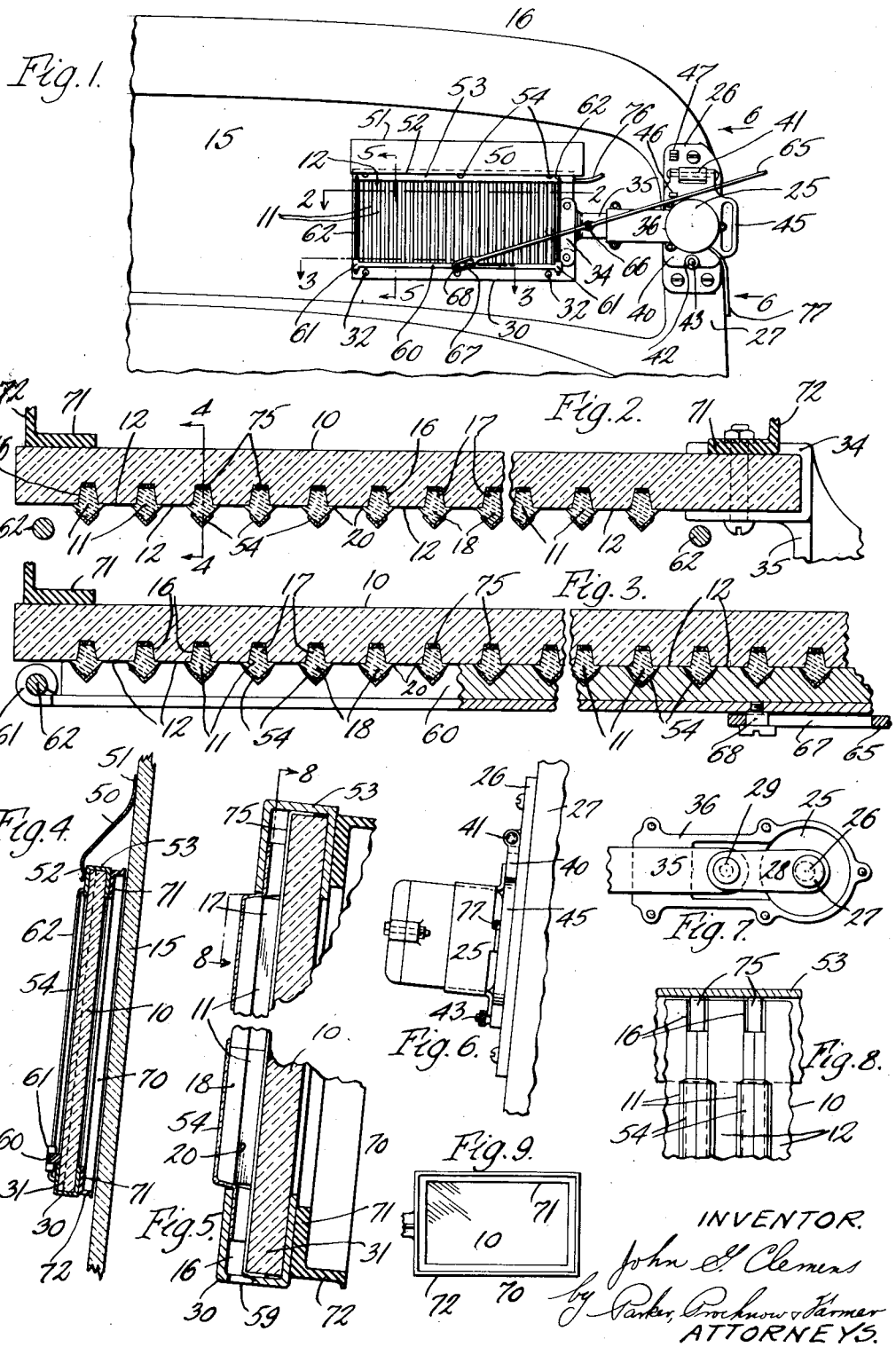
INVENTOR.
John G. Clemens
by Parker, Prochnow & Farmer
ATTORNEYS.

Patented Aug. 27, 1935

2,012,598

UNITED STATES PATENT OFFICE 2,012,598

CLEAR VISION DEVICE

John G. Clemens, Kenmore, N. Y.

Application November 27, 1934, Serial No. 755,018

17 Claims. (Cl. 296—84)

This invention relates to means for or a device to effect clear vision through a windshield or a selected area thereof during rain, snow or sleet storms, or when moisture is otherwise deposited on the front face of the windshield.

Some objects of the invention are to provide means of improved construction for attaining the above purpose; with which the usual annoyance, inconvenience and hazards due to the partial obstruction of vision of the driver or other occupant of the vehicle due to the presence or deposit of rain or other moisture on the face of the windshield is avoided by the use of strips of suitable moisture absorbing material closely arranged so as to expose relatively narrow areas of unobstructed glass of such width that drops of moisture deposited thereon will, as they spread, encounter and be absorbed by said moisture absorbing material, thus keeping the exposed glass areas substantially free and unobstructed.

While the objects above stated may be attained by providing the windshield itself with the moisture absorbing strips, I prefer at present to provide a device in the form of a separate attachment of smaller area than the windshield which can be mounted in front of the windshield in line with the eyes of the driver.

Other objects of the invention are to construct a clear vision device which may be attached in front of or to a windshield to provide clear vision under the conditions stated, and which is of neat and attractive appearance, is of compact form and is strong and durable so as to give the desired results over a long period with the minimum of care and replacement of parts; which is susceptible of application either as a stationary fixture or which may be provided with means for moving the device to and fro before the windshield in such a manner and at such speed that the obstruction of vision by the moisture absorbing strips, which of necessity are opaque, is reduced to a minimum; with which excess moisture absorbed by the strips of the device is discharged therefrom without attention; with which snow, sleet and other forms of more or less solid precipitation deposited on the device can be melted or changed to moisture so as to be readily absorbed and discharged, and which can be mounted, if desired, so as to be moved out of the line of vision when conditions are such that its use is not required; also to construct a device with which moisture and foreign matter is substantially prevented from entering between the device and the adjacent face of the windshield; and to provide such a device with means for keeping the face thereof in clean, effective condition under all conditions.

Various other objects and advantages of the invention will be apparent from the following disclosure of an embodiment thereof, the novel features of which will be set forth in the appended claims.

Fig. 1 is a face view of a portion of a windshield of an automobile, having operatively associated therewith a clear vision device embodying my invention.

Fig. 2 is a fragmentary horizontal section, on an enlarged scale, of a portion of the device, on line 2—2 of Fig. 1.

Fig. 3 is a similar view thereof, on line 3—3 of Fig. 1.

Fig. 4 is a vertical cross section of the device and the adjacent part of the windshield on line 4—4, Fig. 2.

Fig. 5 is a similar section of the device, on a still larger scale, on line 5—5, Fig. 1.

Fig. 6 is a side elevation of the device viewed in the direction of the arrows 6—6, Fig. 1.

Fig. 7 is an enlarged fragmentary, sectional elevation showing the driving connection between the movable unit of the device and the driving motor.

Fig. 8 is an enlarged sectional elevation of part of the device taken approximately on the line 8—8, Fig. 5.

Fig. 9 is a rear view of the glass sheet of the clear vision device.

The clear vision device in the embodiment of the invention illustrated comprises a rigid, transparent sheet or plate of glass or the like 10 having extending across or disposed at the front face thereof a series of strips 11 of moisture absorbing material. These strips are relatively narrow and are closely spaced at the front of the sheet 10 so as to provide or leave exposed between them relatively narrow areas or elongated sections 12 of the glass sheet. These exposed strips or areas of the front face of the glass are of such width that drops of moisture, such as rain, collecting thereon will, as they flatten out or spread in the usual characteristic way, impinge against or encounter some portion or portions of the adjacent strips of the moisture absorbing material, whereupon these strips will absorb the moisture and thus keep the faces of the exposed areas 12 of glass substantially free or clear and thereby enable substantially unobstructed vision to be obtained through areas 12 of the sheet 10.

The sheet 10, as shown, is arranged in substantially parallel relation to and in front of a windshield 15 of any suitable construction and which occupies the front opening of the body 16 of a motor vehicle, as usual.

The moisture absorbing strips 11 may be formed of any suitable material, but at the present time I propose to use strips of unglazed porcelain or baked clay, the characteristics of which are such as to readily absorb moisture contacting therewith.

It should be understood, however, that any other suitable material having the desired characteristics can be used to form the strips 11.

While the strips 11 can be of any desired shape and can extend over and be supported at the front of the sheet 10 in any suitable way, I prefer to provide the sheet 10 with a series of parallel grooves or channels 16 which may be ground or molded into the front of the sheet 10, and the moisture absorbing strips 11 are formed with a rear rib or body portion 17 shaped to approximately fit in the grooves 16, and forwardly or outwardly of these ribs or body portions 17 the strips may be formed with forwardly extending head portions 18, the bases of which are wider in a lateral direction than the ribs 17 so as to thereby form oppositely extending flanges or shoulders 20 on each strip which bear upon or engage with the front face of the glass sheet 10 adjacent the outer edges or corners of the channels 16. This arrangement assures the proper passage of the moisture to and the absorption of said moisture by said strips.

The strips 11 may be arranged in the desired parallel relation in any direction upon the sheet 10. However, I prefer to arrange them so that they extend in an up and down direction so that excess moisture absorbed by these strips can find its way to and be discharged or drip from the lower ends of the strips to thereby enable the device to function at full capacity.

In the arrangement shown in the drawing the strips 11 and the grooves 16 are disposed in substantially vertical arrangement but these strips and grooves can be angularly disposed, if desired, as long as a general up and down disposition thereof is maintained.

Since the moisture absorbing strips 11 are necessarily opaque and the area of clear vision through the device is limited to the spaces or areas 12 of glass between the strips, I propose to mount the device so that it may be moved to and fro in a lateral direction while maintaining parallelism of the device with the windshield, to a degree and at such speed that the vision obstructing effect of the strips 11 will be reduced to a minimum. This may be effected by reciprocating or shifting the device to and fro a distance such that the exposed areas 12 of the sheet will be shifted into and out of the position occupied by other exposed areas at each end of the stroke of the device.

The reciprocation of the clear vision device may be effected in any suitable way, this being done in the construction illustrated by the use of a small electrical motor 25 which is stationarily supported at one side of the clear vision device, for example, upon a fixed plate 26 secured to the upright side frame 27 of the windshield 15. In order to afford adequate support for the device under these conditions I provide a rugged frame member or supporting bar 30 which may be of channel or other suitable cross section and which is secured upon or about the lower horizontal edge 31 of the glass sheet 10, as by screws or other suitable securing devices 32. The end of the bar 30 nearest the motor 25 is rigidly secured to a stout upright clamp or bracket 34 fastened to the adjacent side or end portion of the glass sheet 10. The bracket 34 is provided with a lateral extension in the form of a substantially horizontal slide or arm 35 which is received in a guide sleeve or housing 36, Fig. 7, rigidly secured to or which may form a lateral integral extension of the casing of the motor 25.

One end of the shaft 26 of the motor 25, as shown in Fig. 7, is provided with an eccentric 27 which fits in a hole formed in one end of a connecting link or drive member 28. The other end of this link 28 is pivotally secured at 29 to the outer or free end of the slide or arm 35 of the device within the sleeve 36. The stroke of the eccentric 27 is such as to actuate the clear vision device in a horizontal direction for the necessary distance to effect the results above stated.

The clear vision device, as illustrated in Fig. 1, is preferably arranged in the line of vision of the driver of the vehicle, and it is desirable to construct or mount the device so that the same may be shifted out of the line of vision of the driver when it is not needed. Accordingly, I secure the base plate 40 of the motor 25 upon the fixed plate 26, before described, by means of a horizontally extending hinge or pivot 41 at the upper end of the plate 40, and to prevent lateral displacement of the plate 40 I form a notch 42 in the lower edge thereof which engages about a threaded stud 43 provided with a hand nut or other suitable securing device which, when tightened bears upon and secures the plate 40 in position.

Upon disengaging the hand nut from the stud 43 the plate 40 and the clear vision device can be swung about the hinge or pivot 41 to an upper inoperative position by means of a handle 45 on the plate 40, being there secured by the engagement of a projection 46 on the plate 40 in a suitable catch 47 on the stationary plate 26. Any other suitable means may be provided for securing the plate 40 in its operative and inoperative positions respectively.

When the clear vision device is mounted for reciprocation in the manner described, it is desirable that the device be arranged in spaced relation to the face of the windshield and in order to prevent the descent of moisture and foreign matter between the back of the device and the face of the windshield I provide a suitable guard which in the construction illustrated, comprises a resilient flaplike member 50 extending between the face of the windshield and the upper front portion of the device. The member 50 may be formed of a strip of suitable material which is somewhat longer than the width of the device so as to extend over the ends of the same during its reciprocation, and this strip 50 is secured at its upper horizontal edge 51 to the front face of the windshield 15 by cementing it or otherwise. The lower edge portion of the member 50 is extended over the upper edge portion and upon the adjacent front face of the device, as indicated at 52. Preferably, I enclose the upper edge portion of the glass plate 10 within a suitable channel or frame member 53 secured by bolts or fastening devices 54 and the lower edge portion 52 of the guard member 50 engages upon the front flange of this member 53.

I preferably mold or cast or otherwise form the moisture absorbing strips 11 in short sections, as illustrated in Fig. 5, so as to facilitate their manufacture and their application to the plate 10 and to reduce the cost of replacement should the strips break. To retain the sections of the strips 11 in the grooves 16, I provide retaining members or bars 54 which correspond to the shape of the crowns or outer portions of the heads of the strips 11 so they may engage lengthwise of and upon the strips and act as retainers therefor. The upper and lower ends of the retaining strips 54 may be secured beneath the front flanges of the upper and lower frame bars 53 and 30 respectively.

It should here be noted that when the lower frame member 30 is formed so as to extend across the lower edge of the plate 10, said bar or member is provided with openings 59 in the crosswise portion thereof, see Fig. 5, so that free drainage of the moisture from the lower ends of the strips 11 is permitted.

When the clear vision device is in use, it may at times be subjected to a deposit of muddy water or other foreign matter and, accordingly I provide a wiper bar or member 60 which extends horizontally in front of the device from side to side thereof, and is formed to fit over and between the moisture-absorbing strips 11 and to engage the exposed spaces 12 of the plate 10. The wiper bar 60 is mounted for movement lengthwise of the strips 11, having for this purpose sleeves 61 at its opposite ends which slidably engage about upright rods or guides 62 secured at the front of the device in the upper and lower frame members 53 and 30, and in spaced relation to the device.

The driver may actuate the wiper bar 60 without leaving his seat by the manipulation of an operating lever 65 which is pivoted between its ends at 66 to the slide or arm 35 of the device so as to be movable therewith in the reciprocation of the device. One end of this lever 65 is formed with a slot 67 which engages a stud 68 extending forwardly from the wiper bar 60, and the opposite end of the lever 65 extends to a position where it may be readily grasped and actuated by the driver.

It is possible that under some conditions the flaplike guard member 50 may not be sufficient to prevent the entrance of moisture between the sides and bottom of the clear vision device and the face of the windshield 15 and accordingly I provide upon the rear face of the sheet 10 a marginal frame-like member, preferably of resilient material such as rubber. This member 70 may include an attaching flange 71 extending parallel with the back of the sheet 10 to which it may be secured by cementing or by means of the fastening screws or devices 32 and 54 which secure the bottom and top frame members 30 and 53, respectively, to the sheet 10. Additional securing devices may be provided, if desired. Extending from the outer edges of the rectangular flange 71 is a rearwardly extending flange or web 72.

When this protecting frame or member 70 is used with a movable clear vision device as illustrated in Figs. 1 to 7, the rear edges of said member are preferably arranged in slightly spaced relation to the face of the windshield, as shown in Fig. 4, so as to avoid friction between the member 70 and the windshield when the device is in operation. The space or clearance between the rear edge of the member and the windshield under these conditions need only be very slight so that considerable protection is afforded against the entrance of rain and the like between the device and the windshield face.

It may be expedient in order to meet the demands of different users to produce the clear vision device not only as a movable structure operatively mounted and connected as described, but also in the form of a stationary unit comprising only the sheet 10 and the moisture absorbing strips, and the frame members. The slide or arm 35, the guide or housing 36, together with the motor 25 and its supporting means are omitted in this form. In this case other means than the supporting bar 30 and arm 35 may be provided for retaining the clear vision device in position.

With such an arrangement the frame member 70 will, as before, act to prevent the entrance of moisture or other matter between the back of the device and the shape of the windshield.

In regions where the temperatures are such that snow, sleet and ice may be encountered, it is desirable to provide means for melting any accumulation of such matter, which may be deposited on the face of the clear vision device, so that the snow, ice or sleet may be transformed to water which can be readily absorbed by the moisture absorbing strips 11. A practical disclosure of means for this purpose is illustrated in the drawing wherein I provide electrical conducting strips or elements 75 for warming the moisture absorbing strips 11 and the sheet 10 so as to melt the snow, ice and sleet, as stated above.

In the arrangement illustrated, I dispose one of the electrical elements or strips 75 in each of the grooves 16 between the bottom of the groove and the adjacent rear face of the strip 11. The ends of the elements 75 may be bent rearwardly over and upon the top and bottom edges respectively of the glass sheet 10 so that the top and bottom frame members 53 and 30 respectively, which are formed of metal, can engage with and clamp the elements 75 in position and at the same time provide the necessary means for conveying electric current to the elements 75 to complete the circuit therebetween.

Suitable electric conductors or cables 76 and 77 may be provided for conveying current to said frame members and to the motor 25 respectively from a suitable source of supply on the vehicle.

When the clear vision device is provided with the electrical elements 75, the retaining strips or members 54 for retaining the moisture absorbing strips in position are formed of suitable insulating material so that these members will not produce a short circuit between the top and bottom frame members of the device. The ends of the retainers being extended beneath the top and bottom frame members, as described, may bear upon and hold the elements 75 in position in the end portions of the grooves 16, which are not occupied by the moisture absorbing strips 11.

I claim as my invention:

1. In a clear vision device, a sheet of glass or similar transparent material having mounted across a face thereof a series of strips of moisture absorbent material arranged in relatively close, spaced relation so that narrow areas of the sheet are exposed therebetween, and the width of said areas being such that drops of moisture collecting thereon will, as they spread, extend to and be absorbed by adjacent moisture absorbing strips.

2. In a clear vision device, a series of strips of moisture absorbent material arranged in relatively close, spaced relation and alternating with narrow areas of transparent material of such width that drops of moisture collecting thereon will, as they spread, extend to and be absorbed by adjacent moisture absorbing strips, said strips being disposed in an up and down direction to enable moisture to discharge from their lower ends.

3. In a clear vision device for use upon a windshield, a sheet of glass or other transparent material arranged in substantially parallel relation to and at the front face of the windshield and having a series of grooves formed in the front face thereof and extending in an up and down direction, and a strip of moisture absorbent material arranged in and extending lengthwise of each groove with the edges of said strips spaced from the edges of adjacent strips so as to leave between said strips narrow similarly extending areas of unobstructed glass, the width of said areas being such that drops of moisture collecting thereon will, as they spread, extend to and be absorbed by adjacent moisture absorbing strips.

4. In a clear vision device, a sheet of glass or similar transparent material having mounted across a face thereof a series of strips of moisture absorbent material arranged in relatively close, spaced relation so that narrow areas of the sheet are exposed therebetween, and the width of said areas being such that drops of moisture collecting thereon will, as they spread, extend to and be absorbed by adjacent moisture absorbing strips, and means for warming said sheet and strips so as to convert snow and ice collecting on the face of said device into moisture to be then absorbed by said strips.

5. In a clear vision device, a sheet of glass or similar transparent material having mounted across a face thereof a series of strips of moisture absorbent material arranged in relatively close, spaced relation so that narrow areas of the sheet are exposed therebetween, and the width of said areas being such that drops of moisture collecting thereon will, as they spread, extend to and be absorbed by adjacent moisture absorbing strips, an electrical element extending lengthwise of each of said strips for warming the same and said sheet so as to convert snow and ice collecting on the face of said device into moisture to be then absorbed by said strips, and means for passing an electric current through said elements.

6. In a clear vision device for use upon a windshield, a sheet of glass or other transparent material arranged in substantially parallel relation to and at the front face of the windshield and having a series of grooves formed in the front face thereof and extending in an up and down direction, a strip of moisture absorbent material arranged in and extending lengthwise of each groove with the edges of said strips spaced from the edges of adjacent strips so as to leave between said strips narrow similarly extending areas of unobstructed glass, the width of said areas being such that drops of moisture collecting thereon will, as they spread, extend to and be absorbed by adjacent moisture absorbing strips, and a cleaning member slidably mounted upon and movable across the front surface of said device in the lengthwise direction of said strips to remove muddy water and foreign matter from said device.

7. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, a movable support on which said device is mounted, and means for reciprocating said movable support and device laterally with respect to said windshield through a stroke such that said exposed areas of said sheet will be shifted into and out of the position occupied by other exposed areas to facilitate maximum visibility through said device.

8. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, frame members secured to the top and bottom portions of said plate, and retaining members extending between said frame members lengthwise of and engaging said strips to hold said strips in position.

9. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, an electrical element extending lengthwise of each of said strips, and current conducting frame members extending crosswise along the top and bottom of said sheet and to which said elements are electrically connected to thereby warm said moisture absorbing strips.

10. In a clear vision device for use upon a windshield, a sheet of glass or other transparent material arranged in substantially parallel relation to and at the front face of the windshield and having a series of grooves formed in the front face thereof and extending in an up and down direction, and a strip of moisture absorbent material arranged in and extending lengthwise of each groove with the edges of said strips spaced from the edges of adjacent strips so as to leave between said strips narrow similarly extending areas of unobstructed glass, an electrical element also extending lengthwise of each of said grooves and connected at opposite ends to current conducting frame members extending crosswise along the top and bottom of said sheet to form means for warming said strips, and insulating members extending between said frame members lengthwise of and engaging said strips to retain said strips in said grooves.

11. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, a support which is fixed with respect to said windshield, a motor supported thereby, a movable support upon which said device is mounted, guide means for said movable support, and an operative connection between said motor and said movable support for shifting said movable support to and fro in said guide means, whereby lateral reciprocation of said device is effected with respect to the face of said windshield.

12. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, a movable support on which said device is mounted, and means for reciprocating said movable support and device laterally with respect to said windshield, and a depending flaplike member having an upper edge portion secured to the face of said windshield at a distance above the top of said device and which has its lower edge portion extending over the front of the upper portion of said device, whereby said member acts to prevent moisture and foreign matter from descending between said device and the adjacent area of the face of the windshield.

13. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, a movable support on which said device is mounted, and means for reciprocating said movable support and device laterally with respect to said windshield, and a guard extending from said windshield and overhanging said device to prevent moisture and foreign matter from descending between said device and the adjacent area of the face of the windshield.

14. In a clear vision device for use upon a windshield, a sheet of glass or other transparent material arranged in substantially parallel relation to and at the front face of the windshield, a series of strips of moisture absorbent material extending in an up and down direction upon the front face of said sheet and spaced apart in such relation that narrow correspondingly extending areas of the sheet are exposed therebetween, means for movably supporting said device in the position stated, a motor, an operative connection between said motor and said device for effecting lateral reciprocation of said device with respect to the face of said windshield, a pivotal support for said motor to enable said motor and said device to be swung as a unit from operative position to an inoperative position, and means for securing said unit in either position.

15. In a clear vision device for use upon a windshield, a sheet of glass or other transparent material arranged in substantially parallel relation to and at the front face of the windshield in spaced relation thereto, a series of strips of moisture absorbent material arranged upon the front face of said sheet in relatively close, spaced relation so that narrow areas of the sheet are exposed therebetween, and a frame-like member secured to and extending rearwardly from the margins of said sheet toward the face of said windshield to exclude moisture and other matter from between said device and said windshield.

16. In a clear vision device for use upon a windshield, a sheet of glass or other transparent material arranged in substantially parallel relation to and at the front face of the windshield in spaced relation thereto, a series of strips of moisture absorbent material arranged upon the front face of said sheet in relatively close, spaced relation so that narrow areas of the sheet are exposed therebetween, means for supporting said device in operative position, means for reciprocating said device to and fro relatively to the windshield in said parallel relation, and a frame-like member secured to and extending rearwardly from the margins of said sheet and approximating the face of said windshield to exclude moisture and other matter from between said device and said windshield.

17. In a clear vision device for use upon a windshield, a sheet of glass or other transparent material arranged in substantially parallel relation to the windshield, a series of opaque objects spaced apart in such relation that narrow correspondingly extending areas of the sheet are exposed therebetween, a movable support on which said device is mounted, and means for moving said support and device through a stroke such that said exposed areas of said sheet will be shifted into and out of the position occupied by other exposed areas to facilitate maximum visibility through said device.

JOHN G. CLEMENS.